May 13, 1952     E. PICK     2,596,915
APPARATUS FOR TREATING WATER

Filed July 24, 1948     9 Sheets-Sheet 1

INVENTOR:

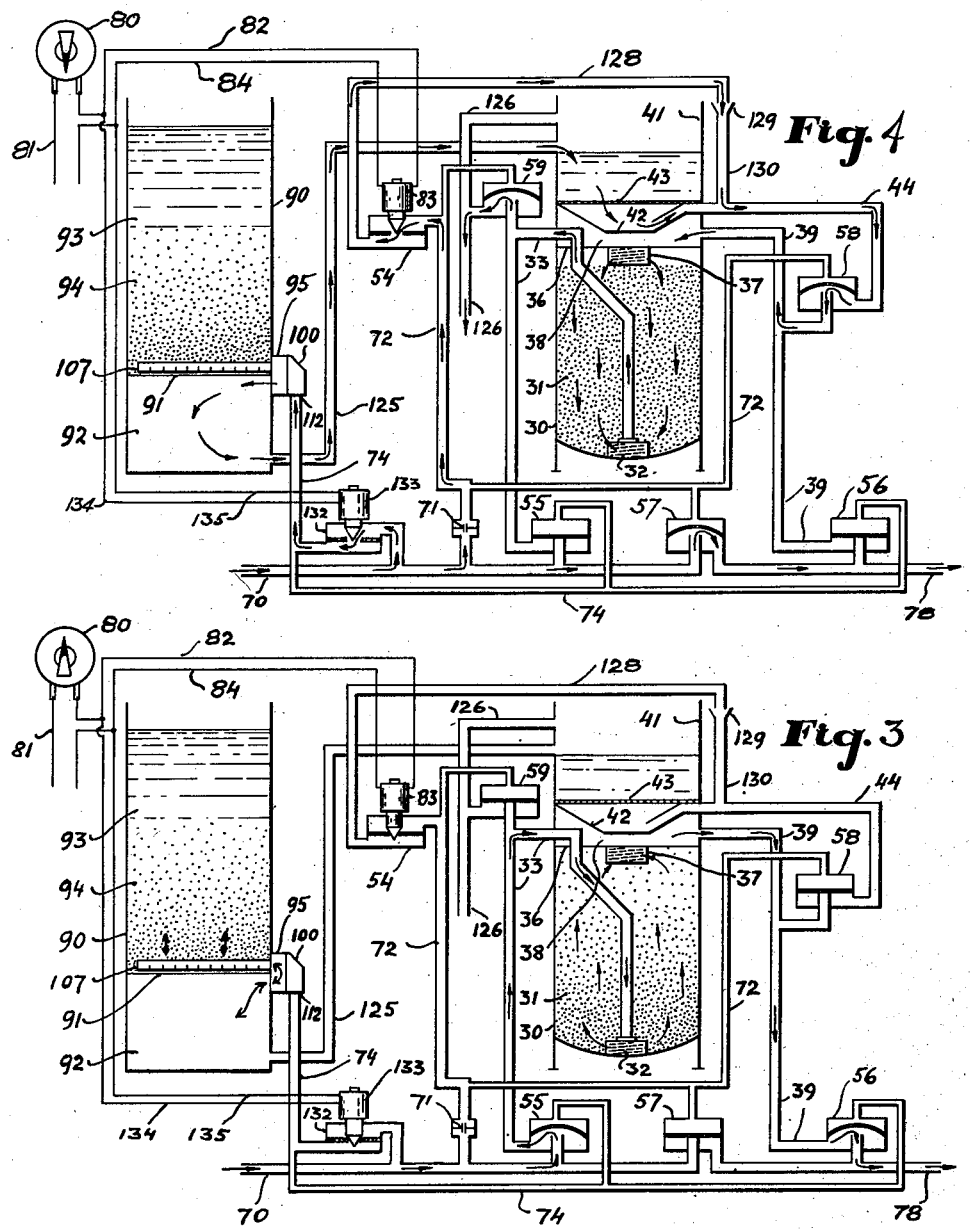

May 13, 1952 E. PICK 2,596,915
APPARATUS FOR TREATING WATER
Filed July 24, 1948 9 Sheets-Sheet 3

INVENTOR:
Erin Pick

May 13, 1952     E. PICK     2,596,915
APPARATUS FOR TREATING WATER
Filed July 24, 1948     9 Sheets-Sheet 4
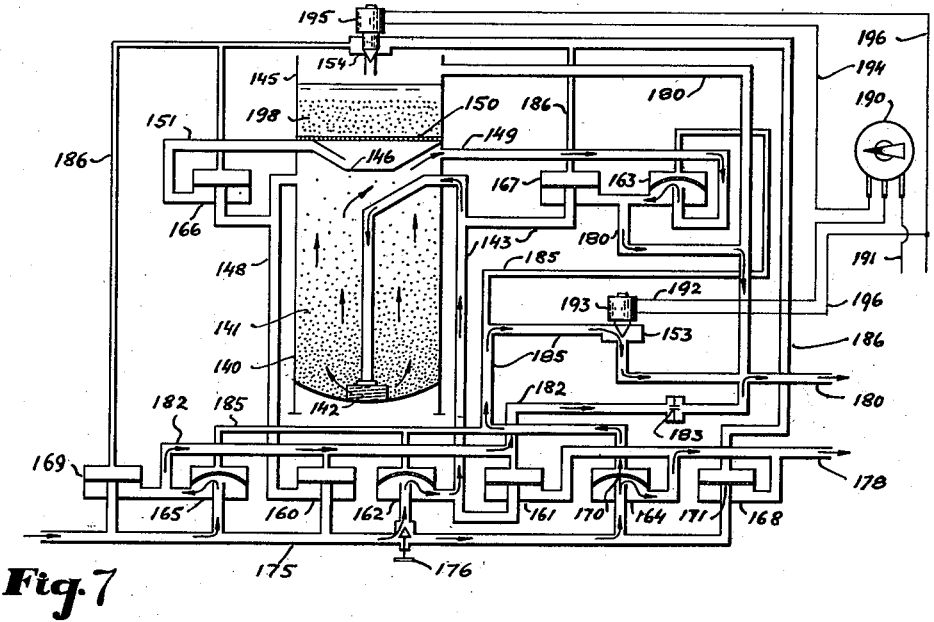
Fig. 7
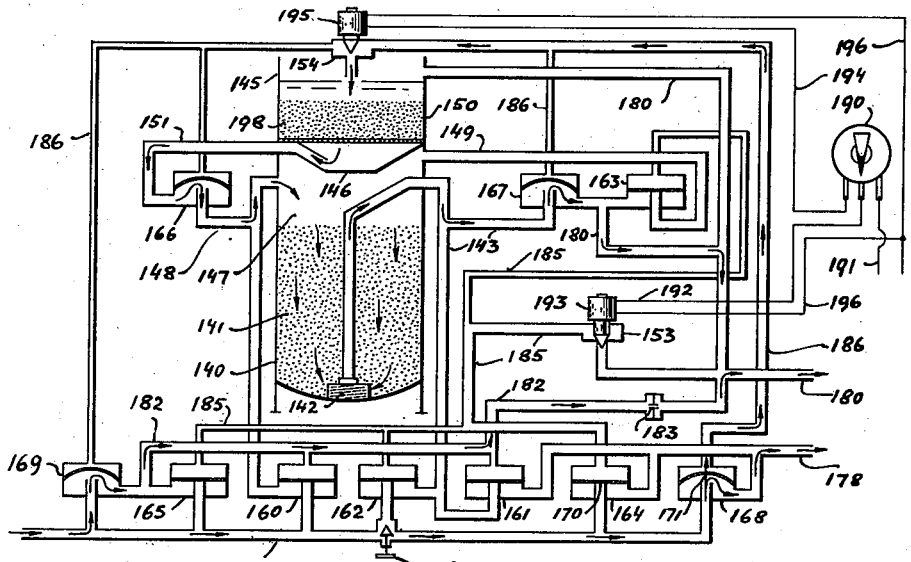
Fig. 8
INVENTOR:

May 13, 1952          E. PICK          2,596,915

APPARATUS FOR TREATING WATER

Filed July 24, 1948          9 Sheets-Sheet 5

INVENTOR:

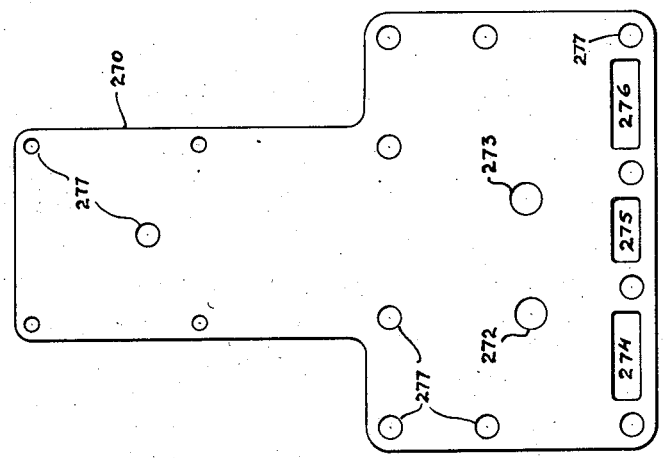
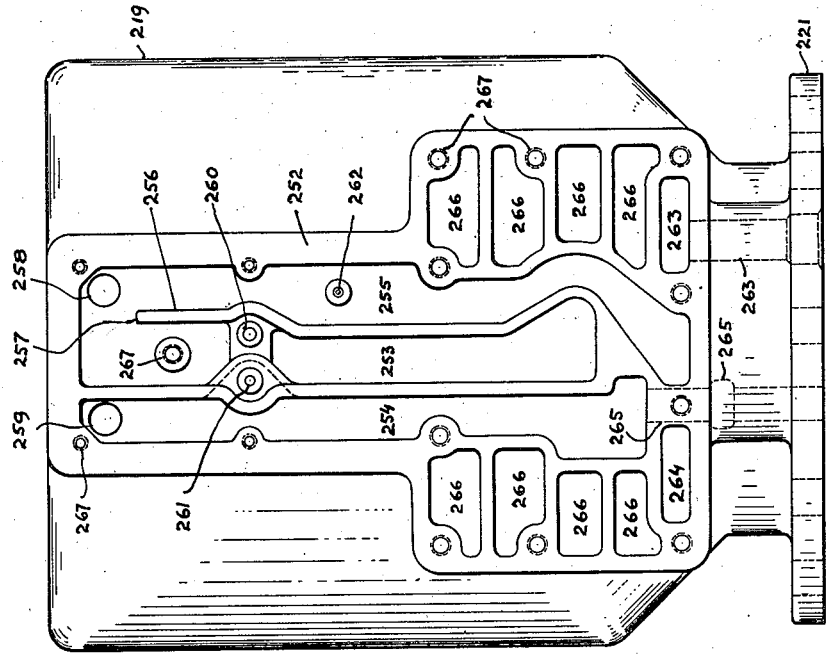

May 13, 1952  E. PICK  2,596,915
APPARATUS FOR TREATING WATER
Filed July 24, 1948  9 Sheets-Sheet 7

INVENTOR:
Eric Pick

May 13, 1952 E. PICK 2,596,915
APPARATUS FOR TREATING WATER
Filed July 24, 1948 9 Sheets-Sheet 8

INVENTOR:

May 13, 1952 E. PICK 2,596,915
APPARATUS FOR TREATING WATER
Filed July 24, 1948 9 Sheets-Sheet 9
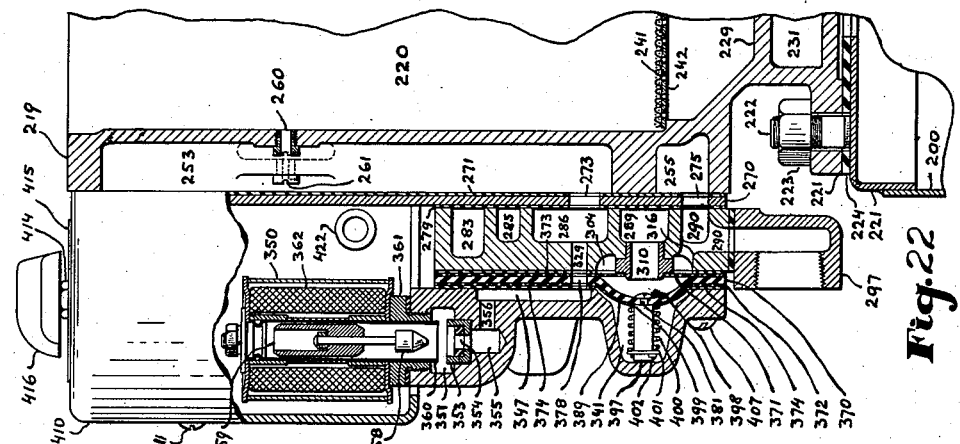
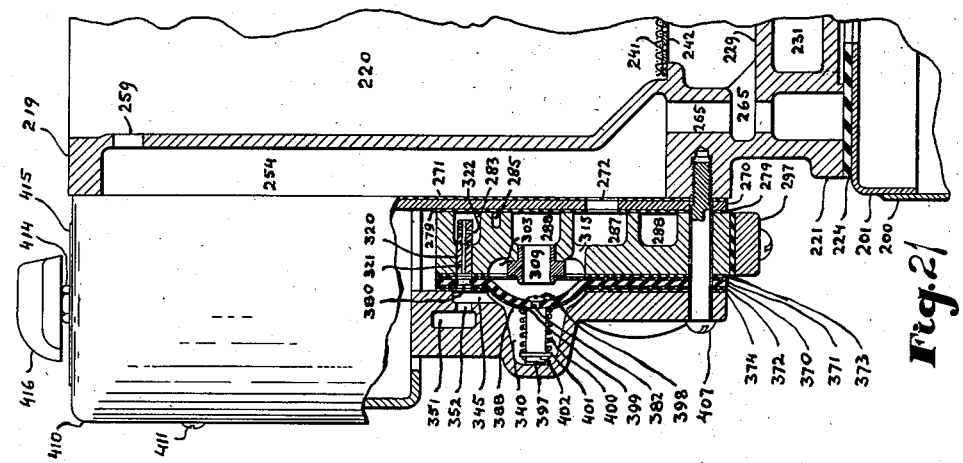
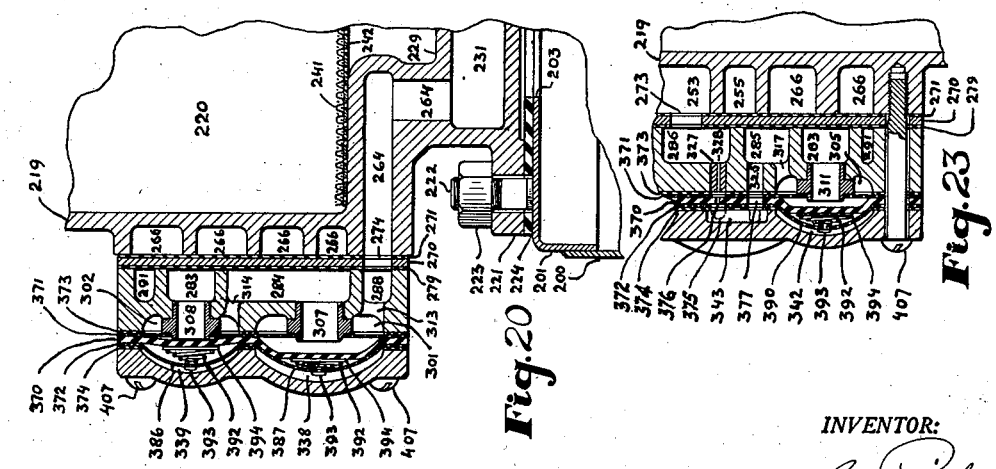
INVENTOR:

Patented May 13, 1952

2,596,915

UNITED STATES PATENT OFFICE 2,596,915

APPARATUS FOR TREATING WATER

Eric Pick, East Rockaway, N. Y., assignor to The Permutit Company, New York, N. Y., a corporation of Delaware Application July 24, 1948, Serial No. 40,528

12 Claims. (Cl. 210—24)

This invention relates to apparatus for treating water or other aqueous solutions of electrolytes by ion exchange in general and especially suited for softening water by cation exchange, and to a method of operating the same.

One of the objects of the present invention is to provide a novel apparatus which is so constructed as not to require the manual actuation of valves in its operation and use and which at the same time is compact, efficient and inexpensive to manufacture.

Another object is to provide for such apparatus diaphragm valves to control the various flows, and pilot valve means to control the operation of said diaphragm valves.

Another object is to provide for a double use of water controlled by the pilot valve means: first, to control the operation of the diaphragm valves and, second, to be utilized in the regeneration of the ion exchange material.

Another object is to provide means for and a method of controlling flow through the apparatus during regeneration, regardless of variations in the supply pressure.

Another object is to provide means for supplying regenerant to the ion exchange material in any desired concentration, and to maintain such concentration regardless of variations in the supply pressure.

A further object is to provide means for convenient handling of the regenerant.

A still further object is to provide a mechanism for controlling the various flows and for effecting regeneration of the ion exchange material which mechanism is mounted as a removable unit on top of the tank containing the ion exchange material.

The manner in which the above and further objects and novel features of this invention are achieved will appear more fully from the accompanying drawings and the following detailed description.

In the drawings, in which similar reference numerals refer to similar parts throughout the several views:

Fig. 3 is a modification of the arrangement of Fig. 1, showing the apparatus in service position;

Fig. 4 is a view of the apparatus of Fig. 3 in regenerating position;

Figs. 6, 7 and 8 are diagrammatic views of another embodiment of my invention, showing the apparatus in service, backwash, and regenerating positions, respectively;

Figs. 9 to 23 illustrate what I consider a preferred construction embodying the arrangement shown diagrammatically in Figs. 1 and 2; more specifically:

Fig. 9 is a rear view of the upper portion of the apparatus;

Fig. 10 is a rear view of the casing 219;

Fig. 11 is a view of the cover plate 270;

Fig. 12 is a view of one face of the valve body 280;

Fig. 13 is another view of the valve body 280 in cross section along line 13—13 of Fig. 14;

Fig. 14 is a view of the other face of the valve body 280;

Fig. 15 is a view of the valve cover 335, partly in cross section along line 15—15 of Fig. 16;

Fig. 16 is a view of the valve cover 335, partly in cross section along line 16—16 of Fig. 15;

Fig. 17 is a rear view of the valve cover 335;

Fig. 18 is a view of the diaphragm 370; and

Figure 9:
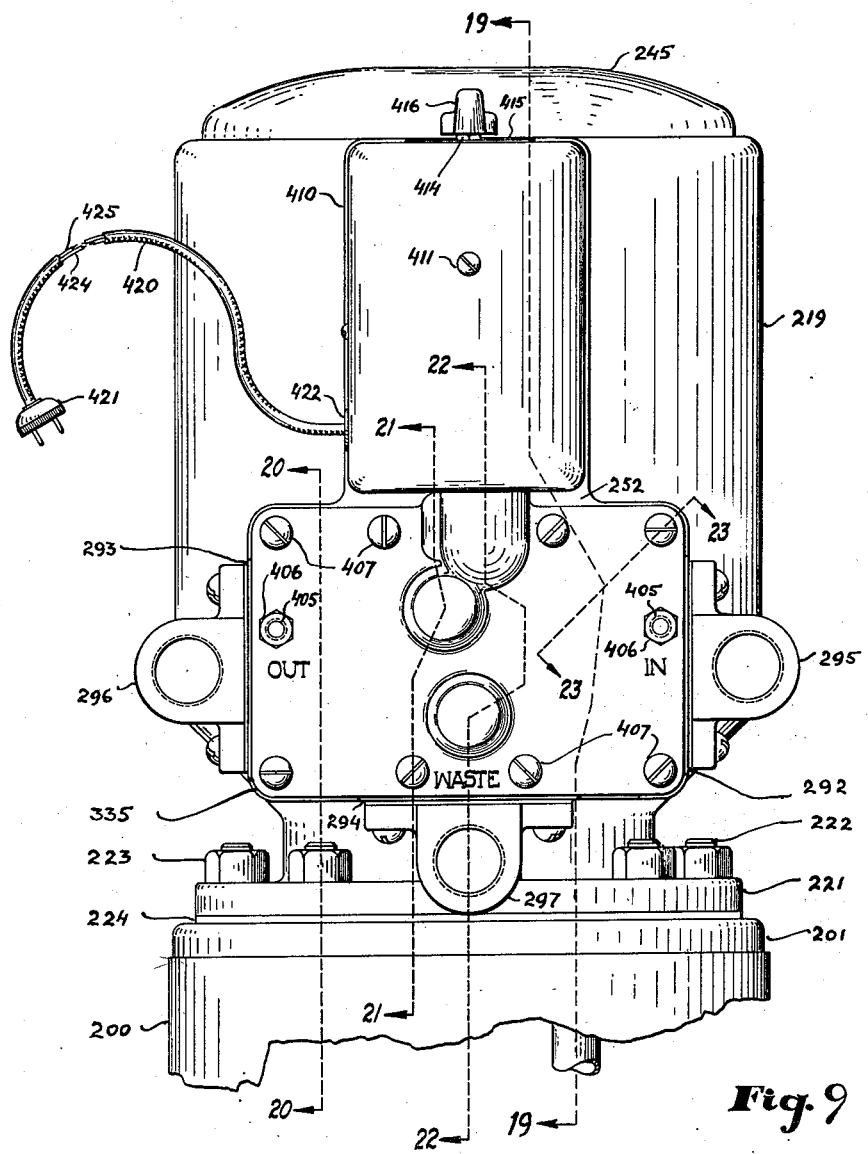
Figure 19:
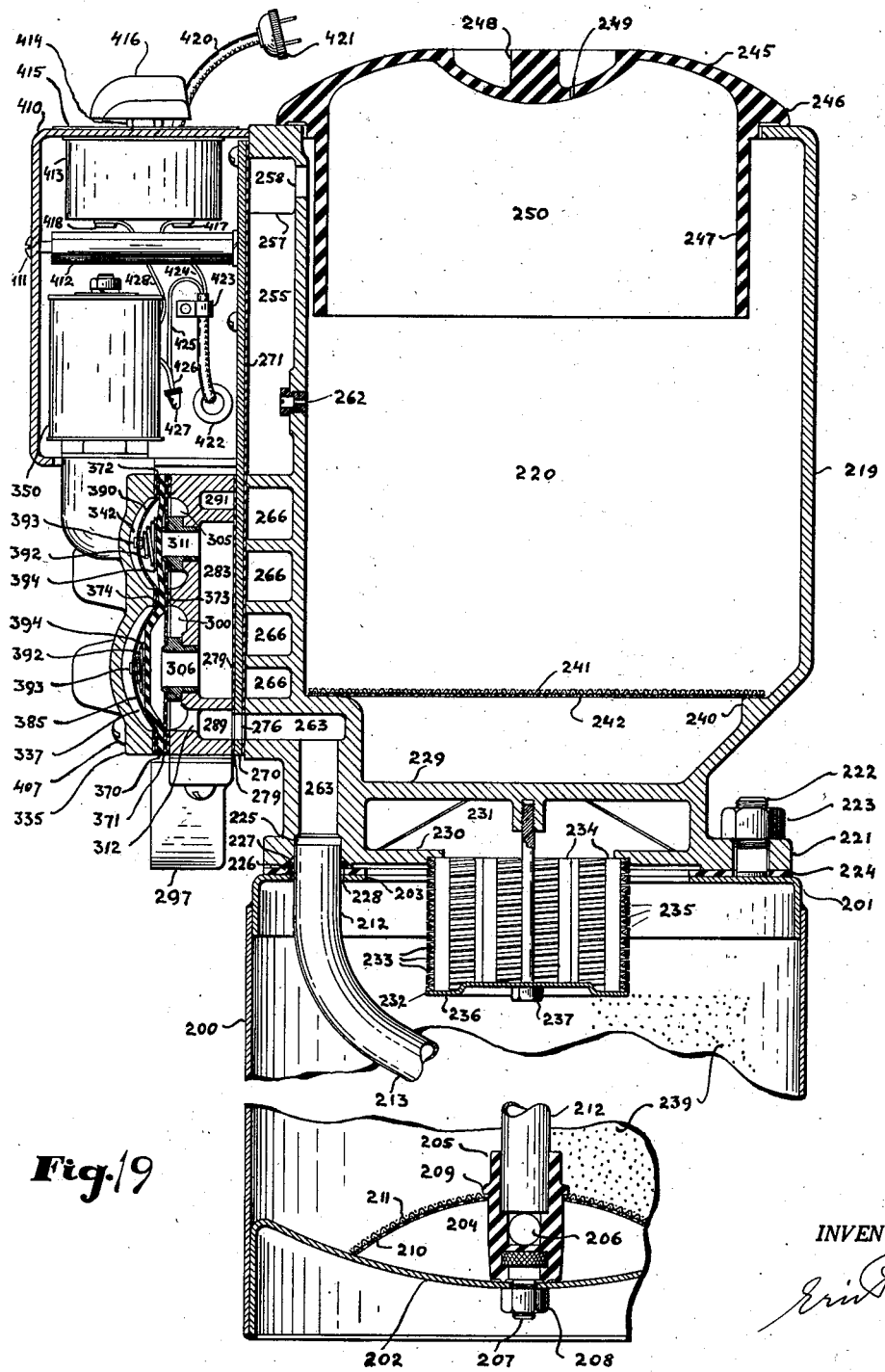

Figs. 19, 20, 21, 22 and 23 are fragmentary views, partly in cross section along lines 19—19, 20—20, 21—21, 22—22 and 23—23, respectively of Fig. 9, the valves being shown in service position in Figs. 19 and 20, and in regenerating position in Figs. 21, 22 and 23.

Figure 2:
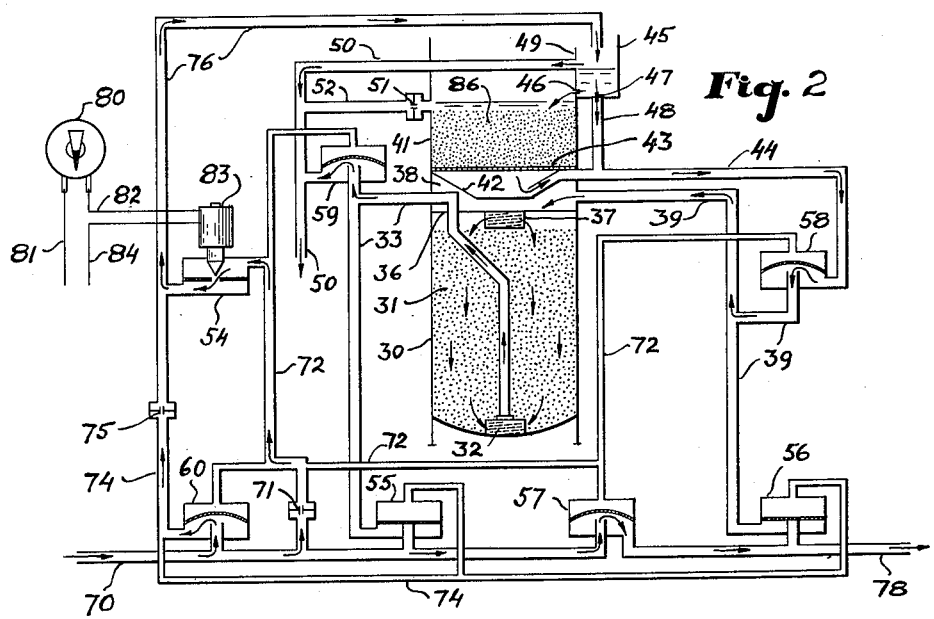
Fig. 2 is a view similar to Fig. 1, but showing the apparatus in regenerating position.
Figure 1:
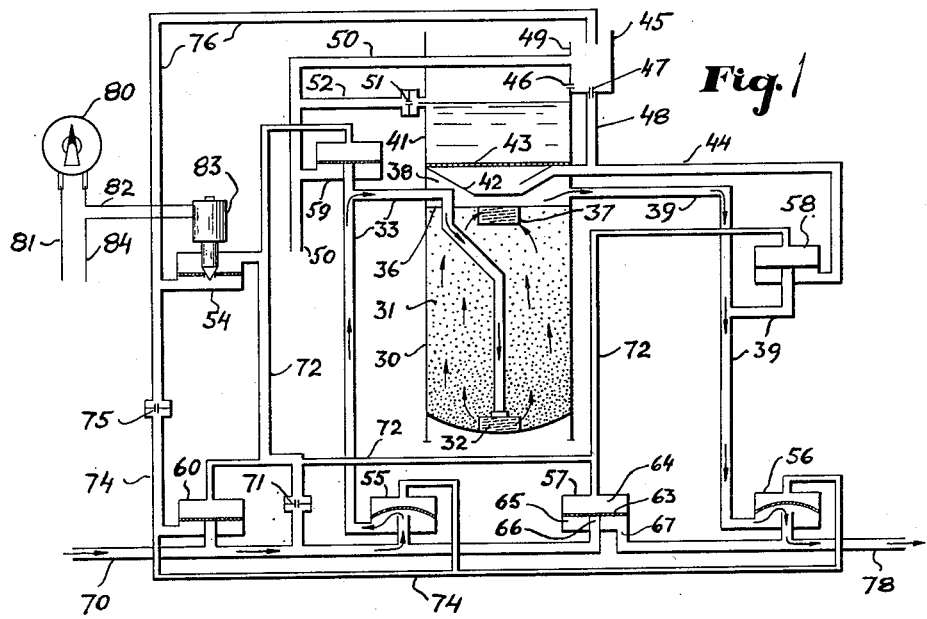
Fig. 1 is a diagrammatic view, partly in cross section, of one form of my invention showing an ion exchange apparatus in service position.

*The apparatus of Figs. 1 and 2*

Referring now to the apparatus shown diagrammatically in Figs. 1 and 2, a tank 30 contains a bed 31 of granular ion exchange material or zeolite and is provided with a bottom distributor 32 the inside of which is in communication with a pipe 33 leading to the outside of the tank. On top of the tank 30 is mounted a regenerant chamber 41 having a bottom 42. Within the tank 30 below the regenerant chamber 41 is a separating plate 36 which carries a collector 37 which is in communication with a compartment 38 formed between the plate 36 and the bottom 42. To the compartment 38 is connected a pipe 39. Over the frusto-conical bottom 42 is placed a screen 43, and a pipe 44 leads from the lowest part of the chamber 41. Adjacent to the regenerant chamber 41 is a head box 45 which is provided with an orifice 46 adapted to discharge into the chamber 41 and another orifice 47 adapted to discharge into a pipe 48 which is connected to the pipe 44. A common wall 49 between the chamber 41 and the head box 45 is lower than their other walls so as to form an overflow weir. From the head box 45 a pipe 50 leads to waste. At a level somewhat below the level of orifice 46 and connecting the chamber 41 with the pipe 50 is a pipe 52 which is fitted with a small orifice or weep hole 51.

Flow through the apparatus is controlled by a solenoid valve 54 which in turn, directly or indirectly, controls six diaphragm valves 55, 56, 57, 58, 59 and 60. Referring specifically to the reference numerals on valve 57 of Fig. 1, each of these diaphragm valves has a diaphragm 63 separating a pressure chamber 64 from a valve chamber 65. In the valve chamber 65 is a central port 66 adapted to be opened and closed by the diaphragm 63, and a lateral port 67 which is always open.

A supply pipe 70 has branches connected with the central ports of diaphragm valves 55, 57 and 60 as well as with an orifice 71. The orifice 71 is adapted to discharge into a branched control pipe 72 which is in communication with the solenoid valve 54 and the pressure chambers of the diaphragm valves 57, 58, 59 and 60. Another control pipe 74 has branches connected with the lateral port of diaphragm valve 60, with the pressure chambers of diaphragm valves 55 and 56 and with an orifice 75 which is arranged to discharge into a pipe 76 having a branch connection with the solenoid valve 54 and leading to the head box 45. The pipe 33 leading from the distributor 32 has branches connected with the lateral port of diaphragm valve 55 and the central port of diaphragm valve 59. The pipe 39 leading from the compartment 38 has two branches, one connected with the lateral port of valve 56 and the other with the central port of valve 58. A pipe 44 leads from the chamber 41 to the lateral port of valve 58. The waste pipe 50 has a branch in communication with the lateral port of valve 59. A service pipe 78 leading to a point of use has branches connected with the lateral port of valve 57 and the central port of valve 56.

A time switch 80 is provided to control the operation of the solenoid valve 54. This time switch 80 is advantageously of the type that is normally open and in which a manual turning of the handle closes the switch and at the same time winds the main spring so that the timing mechanism is thereby placed in operation, and, after running for a predetermined interval of time, opens the switch and stops. Such time switches are well known and have in recent years come into wide use on a variety of appliances. A wire 81 leads from a supply of electric energy to the time switch 80, a wire 82 connects the time switch 80 with the coil 83 of the solenoid valve 54, and a wire 84 leads from the coil 83 back to the supply of electric energy.

In normal operation of the apparatus, as shown in Fig. 1, the time switch 80 is in its normal or open position, the coil 83 is de-energized and the solenoid valve 54 is closed. The water entering from the supply pipe 70 through orifice 71 into control pipe 72 therefore finds no outlet so that the full supply pressure is maintained in control pipe 72 and communicated to the pressure chambers of diaphragm valves 57, 58, 59 and 60 whereby the diaphragms are forced down, thus closing the central ports. At the same time any pressure previously existing within the control pipe 74 is relieved through the orifice 75, which in turn relieves the pressure from the pressure chambers of diaphragm valves 55 and 56, while the full pressure existing in the supply pipe 70 is communicated to their valve chambers. This causes the diaphragms of valves 55 and 56 to lift and open the central ports. Consequently, as shown by arrows in Fig. 1, flow of water takes place from the supply pipe 70 through diaphragm valve 55 and pipe 33 to distributor 32, then upwardly through the bed 31 of ion exchange material, thence through the collector 37 into the compartment 38, and via pipe 39, valve 56 and service pipe 78 to a point of use.

When the apparatus is used to soften water, the bed 31 consists of cation exchange material charged with sodium ions. As the water passes through the bed 31 it is softened. The bed 31 expands during this upward flow to an extent which depends upon the rate of flow. At high rates of flow the escape of granules of ion exchange material is prevented by the collector 37 which has slots narrower than the diameter of the smallest granules.

When the capacity of the bed 31 to exchange ions has been exhausted it is restored by a process known as regeneration. In order to effect regeneration the user has to do but two things: He places a suitable quantity of regenerant 86 into the chamber 41 and he turns the handle of time switch 80, thereby closing the switch and winding its main spring. In the case of a water softener the regenerant 86 is sodium chloride or common salt which comes to rest on the screen 43, as shown in Fig. 2.

The closing of the time switch 80 energizes coil 83 by establishing an electrical circuit through wires 81, 82 and 84, thereby opening the solenoid valve 54. This opening of valve 54 relieves the pressure within the control pipe 72, the orifice 71 being much smaller than any or the passages in the valve 54, and the stream of water entering from the supply pipe 70 through orifice 71 into the control pipe 72 has most of its pressure dissipated by passage through the orifice 71 so that there is substantially no pressure within the control pipe 72. Consequently, the pressure in the pressure chambers of valves 57, 58, 59 and 60 is relieved and the diaphragms of these valves lift and thus open their central ports. The opening of valve 60 admits water from the supply pipe 70 into the control pipe 74 and since the orifice 75 is substantially smaller than the ports and passages of valve 60 the pressure within control pipe 74 rises to substantially the pressure existing in the supply pipe 70 and is communicated to the pressure chambers of diaphragm valves 55 and 56, forcing their diaphragms down to close the central ports. This interrupts the flow of water through the bed 31 to use.

A stream of water is now discharged through pipe 76 into the head box 45, one part coming through orifice 71, control pipe 72 and solenoid valve 54, and the other through diaphragm valve 60, control pipe 74 and orifice 75. The head box 45 fills up until the level therein reaches that of pipe 50, any further rise in level being prevented by overflow through pipe 50 to waste. From the head box 45 two streams of water are discharged; one through the orifice 46 into the chamber 41 and the other through orifice 47 into pipe 48. The stream flowing through orifice 46 percolates through and dissolves the regenerant 86 resting on screen 43 within chamber 41, and the practically concentrated regenerating solution thus formed flows into the pipe 44 where it is mixed with the second stream entering through orifice 47 and pipe 48. The solution is thus diluted in a predetermined proportion depending upon the relative sizes of orifices 46 and 47. The dilute regenerating solution flows by gravity via pipe 44, diaphragm valve 58 and pipe 39 into compartment 38, thence through the collector 37 and downward through the bed of ion exchange material 31, regenerating it. It then enters the distributor 32 and flows via pipe 33, diaphragm valve 59 and pipe 50 to waste.

After all regenerant 86 within chamber 41 has been dissolved, water continues to flow from orifice 46 through chamber 41. The combined streams of water discharged by orifices 46 and 47 follow the same path that had previously been taken by dilute regenerating solution, rinsing spent and excess regenerant from the bed 31.

While regeneration including rinsing of the bed 31 thus proceeds, hard water is available to the point of use through the open diaphragm valve 57 which establishes a direct bypass connection from the supply pipe 70 to the outlet pipe 78. The diaphragm valve 57 may, of course, be omitted when flow of untreated water to the point of use during regeneration is not desired. In many cases in which the installation of two units or the storage of treated water for use during regeneration is impractical, especially in household installations, such bypass, however, is desirable since the availability of hard water in the event of fire, for flushing toilets, etc., is preferable to having no water available at all.

After an interval of time which has been predetermined to allow for complete regeneration and rinsing of the bed 31, the time switch 80 returns to and stops in its normal or open position, de-energizing the coil 83 and thus closing the solenoid valve 54. This restores the apparatus to the service position as shown in Fig. 1.

It should be noted that in order to assure reliable opening and closing of the diaphragm valves 55 to 60 springs should be used to aid the water pressure in either opening or closing the diaphragm valves, as will be explained more fully in connection with the apparatus shown in Figs. 9 to 23.

The orifices 71 and 75 are so dimensioned that their joint discharge is sufficient throughout the range of water supply pressures normally encountered to supply at least sufficient water to the head box 45 to effect regeneration and rinsing of the bed 31 within the allotted time. Water entering the head box 45 in excess of the discharge through orifices 46 and 47 flows via pipe 50 to waste without appreciably changing the level in the head box 45, so that the discharges through orifices 46 and 47 are constant regardless of variations in the supply pressure. Thus, the rates of flow of water used to make up regenerant solution and to dilute such solution and later to rinse out spent and excess regenerant remain constant so that regenerant concentration and regenerant contact time are maintained at the values predetermined for greatest effectiveness, in spite of changing operating conditions. The sizes of the orifices depend, of course, on the size of the apparatus. The diameter of orifice 71 is advantageously made between ⅓% and 1½% of the diameter of tank 30. Thus an orifice $\tfrac{1}{16}$ inch in diameter was found satisfactory for household type water softeners 9 to 12 inches in diameter, the passages leading from the control pipe 72, including those through the solenoid valve 54, being at least 3 and preferably 4 times greater in diameter. With such arrangement about 99% of the pressure of the entering water supply is dissipated in orifice 71 so that during regeneration the pressure within the control pipe 72 is reduced to about 1% or less of the supply pressure which insures reliable and quick opening of the diaphragm valves controlled by the control pipe 72. The diameter of orifice 75 is advantageously between 1% and 4% of the diameter of the diaphragms which it controls, an orifice diameter of 0.04 inch having been found satisfactory in conjunction with a diameter of 2 inches of the diaphragms of valves 55 and 56. With such an arrangement the closing of the diaphragm valve 60 when the apparatus is returned to service position after regeneration causes the pressure from the pressure chambers of diaphragm valves 55 and 56 to be dissipated so slowly through the orifice 75 that a measurable interval of time elapses, usually several seconds, before the valves 55 and 56 open. This is important in order to insure reliable previous closing of the diaphragm valves 58 and 59, and to avoid flooding of the chamber 41. The slow opening of valves 55 and 56 also avoids water hammer in the service pipe 78 on return of the apparatus to the service position.

The sizes of orifices 46 and 47 will vary not only with the size of tank 30, but also with the head for which the head box 45 is designed, with the time allotted to regeneration, the desired rates of flow and the quantity of regenerant and its desired concentration. As an illustrative example, with a head of 2 inches a diameter of $\tfrac{3}{16}$ inch for orifice 46 and ⅛ inch for orifice 47 gave satisfactory results in an apparatus which employed a tank 9 inches in diameter and containing one cubic foot of resinous cation exchange material, and which was provided with a one and one-half hour time switch. When it is desired to regenerate the ion exchange material with concentrated regenerant, which is advantageous with certain types of ion exchangers, the orifice 47 may be omitted so that there is no dilution of the regenerating solution flowing from chamber 41.

When the water supplied to pipe 70 is likely to contain impurities of a size that might clog orifices 71 and 75 it is advantageous to provide on the upstream sides of these orifices strainers that will retain such impurities.

If on return to service the level within chamber 41 is above the pipe 52, the water above this level slowly seeps away to waste through the orifice 51, thereby lowering the level sufficiently to avoid an overflow of the chamber 41 when regenerant is introduced for the next following regeneration. If the water in chamber 41 should unduly rise for any reason it will overflow over the weir formed by the upper end of the wall 49 to be discharged to waste via pipe 50.

Figure 5:
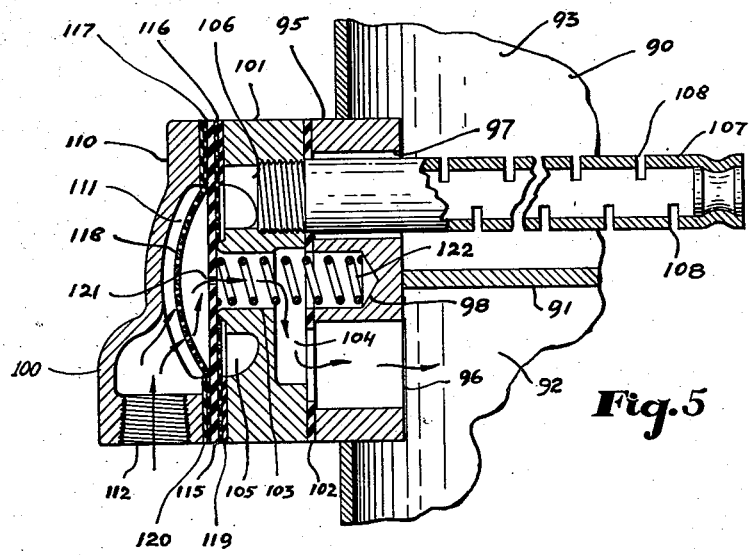
Fig. 5 is a view, partly in cross section, on an enlarged scale and viewed in a direction opposite to that of Fig. 3, showing the regenerant tank valve 100 of the apparatus of Figs. 3 and 4.

*The apparatus of Figs. 3 to 5*

The apparatus shown in Figs. 3, 4 and 5 is a modification of that of Figs. 1 and 2, the principal difference being the addition of a regenerant storage tank which makes it unnecessary to handle and place in the apparatus the quantity of regenerant required for each regeneration. To this end there is provided a regenerant tank 90 which has a partition 91 dividing it into a lower chamber 92 and an upper chamber 93 which contains a quantity of regenerant 94. As shown in Fig. 5, a flange 95 is attached to the side of tank 90. This flange has an opening 96 leading into chamber 92, an opening 97 leading into chamber 93, and a central recess 98.

Attached to the flange 95 is a regenerant tank valve 100. This valve has a body 101 placed against the flange 95 with an interposed gasket 102. The body 101 has a central port 103 communicating with a passage 104 and located in the center of a chamber 105 which is provided with a lateral port 106 into which is screwed a strainer element 107 projecting through the opening 97 into the chamber 93 and provided with slots 108 small enough to prevent passage of regenerant placed in chamber 93. On the body 101 is a cover 110 provided with a cavity 111 forming a pressure chamber and communicating with an inlet connection 112. Between the body 101 and the cover 110 is a diaphragm assembly of the type disclosed and claimed in a co-pending application of Davis and Pick, Serial Number 79,498, filed March 3, 1949, a continuation-in-part of application Serial No. 39,486, filed July 19, 1948, now abandoned. This assembly comprises a diaphragm 115 made of a soft, flexible and resilient material, such as gum rubber, an inner perforated support plate 116, an outer perforated support plate 117 provided with a bulge 118 extending into the pressure chamber 111, a gasket 119 between support plate 116 and body 101, and a gasket 120 between support plate 117 and cover 110. In the center of the diaphragm 115 is an orifice 121. Within the central port 103 and the central recess 98 is a spring 122 which normally tends to move the diaphragm from the central port 103.

The apparatus shown in Figs. 3 and 4 also differs from that shown in Figs. 1 and 2 in that the head box 45 with its connections is omitted, as is the weep hole 51 and pipe 52.

In Figs. 3 and 4 the control pipe 74, instead of discharging into an orifice 75 as in Figs. 1 and 2, discharges into the inlet connection 112 of the regenerant tank valve 100. A pipe 125 leads from the lower chamber 92 into the chamber 41. A waste pipe 126 has two branches, one in communication with chamber 41 and the other in communication with the lateral port of diaphragm valve 59, and leads to a point of disposal. A pipe 128 leads from the solenoid valve 54 to a funnel 129 which discharges into a pipe 130 communicating with pipe 44. In Figs. 3 and 4 is shown a further modification of the arrangement of Figs. 1 and 2 which could, by itself, be incorporated in Figs. 1 and 2, and that is the substitution of a solenoid valve 132 for the diaphragm valve 60. This solenoid valve 132 has a coil 133 connected by wires 134 and 135 to wires 82 and 84, respectively, so that the coils 83 and 133 are in parallel circuits. The valves 54 and 132 are, consequently, opened and closed in unison when the time switch 80 is closed and opened, respectively. The substitution of solenoid valve 132 for diaphragm valve 60 does not, by itself, in any way change the performance of the apparatus. As is apparent from the foregoing description of the arrangement of Figs. 1 and 2, the diaphragm valve 60 differs in function from the other diaphragm valves in that it acts as a control valve for the diaphragm valves 55 and 56, controlling their opening and closing in a manner somewhat similar to that in which solenoid valve 54 controls the opening and closing of the remaining diaphragm valves. In general, I prefer to use a diaphragm valve to control valves 55 and 56, primarily because this is more economical, a diaphragm valve of the type here employed being simpler and less expensive than a solenoid valve and also avoiding the additional use of electric energy.

In normal operation, as shown in Fig. 3, the flow through the apparatus takes place in the same manner as has previously been described in connection with Fig. 1. With solenoid valve 132 closed, the pressure in the control pipe 74 is relieved through the orifice 121. Thus, there is no appreciable pressure within the pressure chamber 111 and the diaphragm 115 is moved by the spring 122 to uncover the central port 103. As a result, there is a communication between the lower chamber 92 and the upper chamber 93 through opening 96, passage 104, port 103, chamber 105, port 106, strainer element 107 and slots 108. Since at the end of regeneration there is water in chamber 92 and regenerant solution of relatively higher specific gravity in chamber 93, a back and forth flow takes place, as shown by arrows in Fig. 3, whereby the chamber 92 is gradually filled with concentrated regenerant solution and the water from chamber 92 rises into chamber 93, there to come in contact with undissolved regenerant 94 whereby additional regenerant solution is formed.

In order to regenerate the apparatus, as shown in Fig. 4, all the user has to do is actuate the time switch 80 so as to energize coils 83 and 133 so that the solenoid valves 54 and 132 are opened. The opening of valve 54 causes valves 57, 58 and 59 to open because of the relief of pressure within the control pipe 72, as explained before, and the stream of water passing through orifice 71 flows through solenoid valve 54 and pipe 128 into the funnel 129. The opening of solenoid valve 132 places the control pipe 74 under pressure and this pressure is communicated to the pressure chambers of diaphragm valves 55 and 56, closing them, and also to the pressure chamber 111 of the regenerant tank valve 100 so that the diaphragm 115 is forced against the port 103, thereby shutting off intercommunication between chambers 92 and 93. A small stream of water flows through the orifice 121, dissipating its pressure during such passage, and continues through the central port 103, the passage 104 and the opening 96 into the lower chamber 92, displacing the regenerant solution therein through the pipe 125 into the chamber 41 whence it flows into pipe 44 where it mingles with and thus becomes diluted by the water entering via funnel 129 and pipe 130. From there on the flow through the apparatus is the same as has been described in connection with Fig. 2. After a predetermined volume of regenerant solution, determined by the size of chamber 92, has been displaced to flow through the bed 31, water follows the same path, rinsing the spent and excess regenerant from the bed 31, until the time switch 80 returns to and stops in its normal or open position, causing the solenoid valves 54 and 132 to close whereby all valves are restored to the positions which they occupy in Fig. 3, and normal service is resumed.

In the apparatus shown in Figs. 3 to 5 it is only necessary to place regenerant periodically into the regenerant tank 90, sufficient for a number of successive regenerations. On the other hand, if there is no regenerant in the regenerant tank 90, a quantity of regenerant suitable for one regeneration may be placed into the chamber 41 either prior to or immediately after actuation of the time switch 80 and regeneration will then proceed in a satisfactory manner.

In Figs. 3 to 5 all the water passing through orifices 71 and 121 is used to regenerate and rinse the bed 31. This makes it necessary to dimension these two orifices, within the limitations set forth in connection with Figs. 1 and 2, to suit the existing operating conditions, especially the pressure at which water is supplied to pipe 70. If a wider range of adaptability with regard to operating pressure is desired, a head box can be provided to receive the water flowing from pipe 128 and to discharge water at a fixed rate into the funnel 129 and pass the excess to waste via an overflow connected to the pipe 126.

Figure 6:
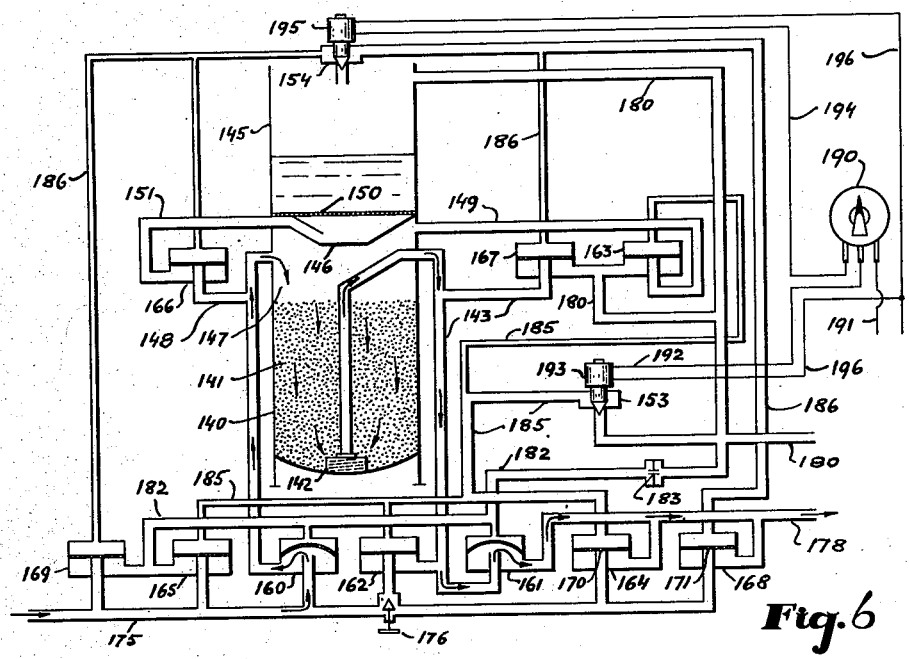

The apparatus of Figs. 6 to 8

In Figs. 6 to 8 is shown a modification of my invention which is particularly suitable for treating turbid water since a backwashing step is included in the cycle of operations.

In this arrangement a tank 140 containing a bed 141 of ion exchange material is provided with a bottom screen 142 and a pipe 143 connected therewith. Above the tank 140 is mounted a regenerant chamber 145 the bottom 146 of which forms the top of the tank 140. The bed 141 of ion exchange material does not completely fill the tank 140 but leaves a rising space 147 to which are connected pipes 148 and 149. Within the chamber 145 is a screen 150 for supporting solid regenerant, and a pipe 151 is connected with the lowest point of the chamber 145.

The flow through the apparatus is controlled by solenoid valves 153 and 154 and diaphragm valves 160 to 169 inclusive. All these diaphragm valves are constructed like valve 57 described in connection with Fig. 1, but the diaphragms of valves 164 and 168 are also provided with small central orifices 170 and 171, respectively. The diaphragm valves 160 to 169 should be provided with springs, as will be explained in connection with the apparatus of Figs. 9 to 23.

A supply pipe 175 has branches connected with the central ports of diaphragm valves 160, 164, 165, 168, 169 and, through a wash rate adjuster 176, with the central port of diaphragm valve 162. A service pipe 178 has branches connected with the lateral ports of diaphragm valves 161, 164 and 168. The pipe 143 has branches connected with the central ports of valves 167 and 161, and with the lateral port of valve 162. The pipe 148 has branches connected with the lateral port of valve 160 and the central port of valve 166. The pipe 149 leads from the rising space 147 to the central port of valve 163, and the pipe 151 connects the lowest point of chamber 145 with the lateral port of valve 166. A waste pipe 180 has branches connected with chamber 145 (forming an overflow therefore), with solenoid valve 153, with the lateral ports of diaphragm valves 163 and 167 and with an orifice 183. The orifice 183 is adapted to discharge from a control pipe 182 having branches connected with the lateral ports of diaphragm valves 165 and 169 and with the pressure chambers of diaphragm valves 160 and 161. Another control pipe 185 has branches connected with the pressure chambers of diaphragm valves 162, 163, 164 and 165 and also with the solenoid valve 153. A third control pipe 186 has branches connected with the solenoid valve 154 and the pressure chambers of diaphragm valves 166, 167, 168 and 169, the solenoid valve 154, when open, permitting discharge from the control pipe 186 into the chamber 145.

A time switch 190 is provided, similar to time switch 80 but equipped with two independent normally open switches which upon actuation of the time switch 190 are closed in succession, one at a time and for predetermined intervals of time, so as to successively open first solenoid valve 153 and then solenoid valve 154. To this end, circuits are provided including a wire 191 leading from a source of electric energy to the time switch 190, a wire 192 leading from the time switch 190 to a coil 193 of solenoid valve 153, a wire 194 leading from the time switch 190 to a coil 195 of the solenoid valve 154, and a wire 196 with two branches leading from the coils 193 and 195 back to the supply of electric energy.

In normal operation of the apparatus, as shown in Fig. 6, the pressure in the control pipe 182 and, consequently, in the pressure chambers of valves 160 and 161, is bled off through the orifice 183 into the waste pipe 180 so that valves 160 and 161 open and flow of water through the apparatus to service takes place via pipe 175, valve 160, pipe 148, downwardly through the bed 141, and then through screen 142, pipe 143, diaphragm valve 161, and pipe 178, as indicated by the arrows.

When regeneration is required, the user places a suitable quantity of regenerant in the chamber 145 and actuates the time switch 190 whereby coil 193 of solenoid valve 153 is energized. This places the apparatus in the backwash position shown in Fig. 7. The valve 153 opens, thus permitting discharge to the waste pipe 180 of the restricted flow of water entering from supply pipe 175 through the orifice 170 into the control pipe 185. Because of the restriction in orifice 170 the pressure within the control pipe 185 and the pressure chambers of diaphragm valves 162, 163, 164 and 165 drops, thus causing valves 162, 163, 164 and 165 to open. The opening of valve 165 admits an unrestricted flow of water into the control pipe 182. This water can escape but slowly through orifice 183 and waste pipe 180 so that pressure is built up within the control pipe 182 and communicated to the pressure chambers of diaphragm valves 160 and 161 to close them, thereby shutting off the flow of water through the apparatus to service. At the same time a backwash flow is initiated, as indicated by the arrows, from supply pipe 175 through the wash rate adjuster 176, valve 162, pipe 143, screen 142, upwardly through the bed 141, pipe 149, valve 163, and pipe 180 to a point of disposal. This upward flow of water through the bed of ion exchange material at an appropriate rate, regulated by a suitable setting of the wash rate adjuster 176, expands the bed of ion exchange material, regarding it and washing any dirt collected thereon to waste.

After a suitable interval of time, usually about 5 to 10 minutes, the time switch 190 de-energizes coil 193, thus causing the solenoid valve 153 to close, and instead energizes the coil 195, causing solenoid valve 154 to open, thereby placing the apparatus in the regenerating position shown in Fig. 8. The closing of solenoid valve 153 causes pressure to build up in the control pipe 185 and the pressure chambers of diaphragm valves 162, 163, 164 and 165 through the orifice 170 so that valves 162, 163, 164 and 165 are closed, the closing of valves 162 and 163 terminating the flow of wash water. On the other hand, the opening of the solenoid valve 154 bleeds off the pressure in control pipe 186. A stream of water enters through orifice 171 and in passage through this orifice loses most of its pressure, and then discharges through open solenoid valve 154 into the chamber 145. As a result of the reduction of pressure in the control pipe 186 and, consequently, in the pressure chambers of diaphragm valves 166, 167, 168 and 169 these valves are opened. The now open diaphragm valve 169 takes over the function of the previously open diaphragm valve 165 to admit an unrestricted flow of water into the control pipe 182, thus maintaining it under pressure, as during backwashing, so that the valves 160 and 161 remain closed. The flow of water entering the chamber 145 through solenoid valve 154 dissolves the regenerant placed in chamber 145 and the solution thus formed flows via pipe 151, valve 166, and pipe 148 into the rising space 147 and then downwardly through the bed 141, regenerating the ion exchange material. The spent and excess regenerant solution flows through the screen 142 into the pipe 143 and thence through valve 167 and pipe 180 to waste. When all the regenerant in chamber 145 has been dissolved, water follows the flow path previously taken by the regenerating solution, thus rinsing the bed 141 free of regenerant.

During the entire cycle of regenerating operations there is available a flow of hard water from the supply pipe 175 to the service pipe 178, first through the open diaphragm valve 164 during backwashing and then through the open diaphragm valve 168 during regenerating, as shown by arrows in Figs. 7 and 8, respectively. If no such bypass during the cycle of regenerating operations is wanted, the diaphragm valves 164 and 168 may, of course, be omitted.

After a suitable interval of time the time switch 190 returns to and stops in its normal position in which both of its switches are open, de-energizing coil 195 so that solenoid valve 154 closes whereby all valves are restored to the position shown in Fig. 6 and normal service operation is resumed.

The arrangement shown in Figs. 6 to 8 provides for regeneration with concentrated regenerant solution. When this is not desirable, dilution of the regenerant solution can be obtained in a number of different ways. For instance, the discharge from solenoid valve 154 can be divided by means of a head box and orifices into two streams, as in Figs. 1 and 2, one directed into the chamber 145 to form concentrated regenerant solution, and the other into pipe 151 to dilute such solution. Or, the flow from solenoid valve 154 can be reduced, by a reduction in the size of orifice 171, or by the use of a head box with overflow to waste, such as the head box 45 of Fig. 1, to a fraction of the total rate of flow required for regeneration, and directed into pipe 151 to provide dilution water; the discharge from orifice 183 can then be passed into the chamber 145 instead of into the waste pipe 180 to make up concentrated regenerating solution, the chamber 145 itself acting as a head box. With such modification, when the outlet pipe 151 is closed during backwashing, the discharge of orifice 183, after filling the chamber 145, overflows into the waste pipe 180, and since such water enters and leaves the chamber 145 at the top, above the level of regenerant, there is no appreciable loss of regenerant during the brief period of backwashing.

The diaphragm valves 165 and 169 can be replaced by two solenoid valves, one having its coil wired in parallel with coil 193, and the other with coil 195, analogously with the arrangement shown in Figs. 3 and 4. As a matter of fact, both diaphragm valves 165 and 169 can be replaced by a single solenoid valve, provided its coil is energized throughout backwashing and regenerating by a third switch provided in the time switch 190.

The dimensions of orifices 170, 171 and 183 must be adapted to the size of the apparatus. What has been stated in the description of Fig. 1 and 2 with regard to orifice 71 applies also to orifice 171, and what has been stated with regard to orifice 75 applies to orifice 183. Orifice 170 may be equal in size or somewhat smaller than orifice 171.

*The apparatus of Figs. 9 to 23*

In Figs. 9 to 23 is illustrated a preferred construction of the arrangement shown diagrammatically in Figs. 1 and 2. It should be noted at the outset that the entire mechanism for regenerating the bed of ion exchange material and controlling flow therethrough is made as a unit mounted on top of the tank containing the ion exchange material, and that the various pipes shown as such in Figs. 1 and 2 are here replaced by passages and openings in the constituent parts of the mechanism. These features make the apparatus compact, inexpensive, and attractive in appearance.

The apparatus comprises a tank 200 having a top head 201 and a bottom head 202 (Fig. 19), with a large central opening 203 in the top head 201. As shown in Fig. 19, on the bottom head 202 and within the tank 200 is mounted a distributor 204 having a hollow rubber member 205 with a cross passage 206 therein. Into the rubber member 205 is molded a screw 207 which, by means of a nut 208, is fastened to the bottom head 202, thus securing the distributor 204 in place. The rubber member 205 has an external flange 209 which fits over and retains a strainer element consisting of a dome-shaped perforated plate 210 supporting a similarly shaped wire mesh 211. Into the rubber member 205 is fitted an internal tube 212 the upper portion of which is bent as shown at 213.

Above the tank 200 is mounted a casing 219 which has formed therein a regenerant chamber 220. The casing 219 has an external flange 221 which, by means of studs 222, welded to the top head 201, and nuts 223, is secured to the top head 201, with an interposed gasket 224. In the flange 221 is a counterbore 225 into which is fitted the upper end of the internal tube 212 which protrudes through an opening 228 in the top head 201. Over the protruding portion of tube 212 is fitted a packing ring 226 which is retained in a chamfer 227 pressing the packing ring 226 against the tube 212. This arrangement is effective in making a leak-proof connection between the tube 212 and the counterbore 225. If desired, the gasket 224 and the packing ring 226 can be molded as a single piece.

The chamber 220 has a bottom 229 below which there is an inwardly extending flange 230 so that a compartment 231 is formed therebetween. Against the flange 230 is placed a collector 232 which comprises a wire 233 of triangular cross-section wound into a coil and secured, as by brazing, to rods 234 in such manner that there are narrow slots 235 between adjacent coils of wire 233. A plate 236 is placed over the lower open end of the collector 232 and the entire assembly is secured in place by means of a screw 237.

A bed of granular cation exchange material is placed within the tank 200. The wire mesh 211 and the slots 235 are of such size as to retain the bed 239 which, in the absence of any flow through the apparatus, should fill the tank to a level even with or below the lower end of collector 232.

Within the chamber 220 is a shelf 240 on which rests a wire mesh screen 241 supported by a perforated plate 242. The open top of the chamber 220 is closed by a cover 245 having a flange 246 resting on the casing 219. The cover has deep sides 247 and a recessed handle 248. In the upper portion of the cover 245 is a small vent hole 249 which is provided for the purpose of releasing air, thus preventing a rising of the cover in the event that the water level in chamber 220 should rise above the lower end of the sides 247. The sides 247 are so dimensioned that the cover, on being removed and turned up side down, serves as a measuring compartment 250 for the regenerant that is to be introduced into the chamber 220.

As shown in Fig. 10 one side of the casing 219 has a flat face 252 in which are arranged, side by side, passages 253, 254 and 255. The dividing wall 256 between passages 253 and 255 ends below the top of the casing so as to form a weir 257. Near the upper end of passage 255 is an overflow opening 258 and at the top of passage 254 is a vent hole 259. An orifice 260 leads from the passage 253 into the chamber 220; an orifice 261 leads from the passage 253 into the passage 254, and a third orifice 262 leads from the passage 255 into the chamber 220 at a level somewhat below that of orifices 260 and 261. In the flat face 252 are also passage 263 in communication with the internal tube 212 (Fig. 19), and passage 264 which is in communication with the compartment 231 (Fig. 20). An extension 265 of passage 254 leads to the lowest point of chamber 220 (Fig. 21). There are, moreover, in face 252 tapped holes 267, and a number of relief cavities 266 which are merely provided to avoid excess material so as to reduce the weight and to make the wall thicknesses more uniform which is desirable in the interest of a sound casting.

Against the flat face 252 is placed a cover plate 270 with a gasket 271 of similar shape therebetween. In the cover plate are openings 272, 273, 274, 275 and 276 as shown in Fig. 11, in addition to 15 holes 277 for screws which are used to fasten the parts of the mechanism together. The gasket 271, as well as a gasket 279 placed over the power portion of the cover plate 270, have openings matching those in plate 270.

A valve body 280 (Figs. 12 to 14) has two flat faces 281 and 282, the face 281 being placed against the gasket 279. In the face 281 are passages 283, 284, 285, 286, 287, 288, 289, 290 and relief cavities 291. The sides of body 280 have faces 292, 293 and 294 into which open the passages 283, 284 and 290, respectively (see Fig. 13). Attached to the faces 292, 293 and 294 are the flanged elbows 295, 296 and 297, respectively (see Fig. 9), which serve to connect the apparatus to a source of supply for water to be treated, to a point of use for treated water, and to a point of disposal for waste water, respectively.

In the face 282 of the valve body 280 (Fig. 14) are cavities forming valve chambers 300, 301, 302, 303, 304 and 305, each of which has a central port projecting slightly beyond the face 282, and a lateral port. Thus, chamber 300 has central port 306 opening into passage 283 and lateral port 312 opening into passage 289; chamber 301 has central port 307 opening into passage 284 and lateral port 313 opening into passage 288; chamber 302 has central port 308 opening into passage 283 and lateral port 314 opening into passage 284; chamber 303 has central port 309 opening into passage 288 and lateral port 315 opening into passage 287; chamber 304 has central port 310 opening into passage 289 and lateral port 316 opening into passage 290; and chamber 305 has central port 311 opening into passage 283 and lateral port 317 opening into passage 285.

Flush with the face 282 is a bushing 320 (Figs. 12, 14 and 21) having an orifice 321 therethrough. The bushing 320 projects into the passage 283 and in the projecting portion has a number of cross-passages 322 somewhat smaller than the orifice 321 to provide additional inlets into the orifice 321 which serve to strain out impurities, it being unlikely that all of them will become obstructed with objects carried along by the water and large enough to become lodged in them. In the face 282 are furthermore openings 324 and 325 leading into the passage 285. Flush with the face 282 is another bushing 327 provided with an orifice 328 which opens into passage 286. An opening 329 leads from the face 282 into the passage 286. The body 280 also has screw holes 330 extending from face 281 to face 282.

Fitted against the valve body 280 is a valve cover 335 with a flat face 336 opposed to the flat face 282. In the flat face 336 are cavities forming pressure chambers 337, 338, 339, 340, 341 and 342 which, in assembly, are opposed to the valve chambers 300, 301, 302, 303, 304 and 305, respectively. In the flat face 336 are, moreover, a passage 343 forming an extension of chamber 337, a passage 344 forming an extension of chamber 338, a passage 345 forming an extension of chamber 340, passages 346 which interconnect the chamber 340 with chambers 339, 341, and 342, and a passage 347. The cover 335, furthermore, has screw holes 348 extending therethrough.

Figure 15:
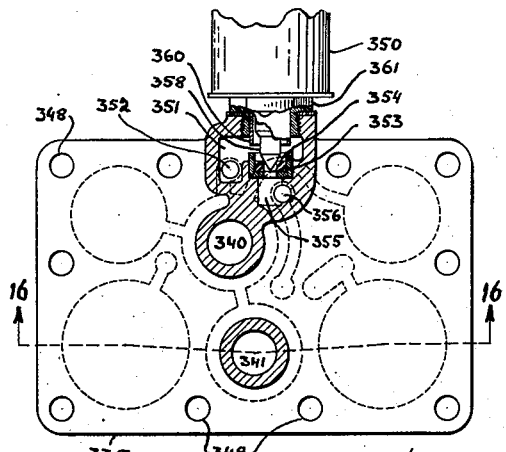
Figure 13:
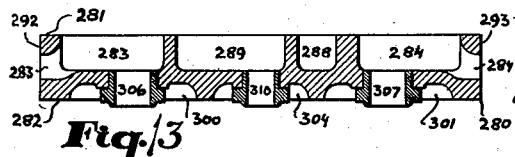
Figure 16:
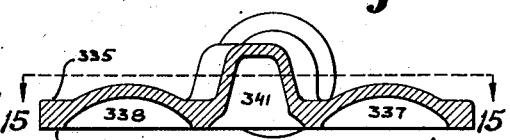
Figure 14:
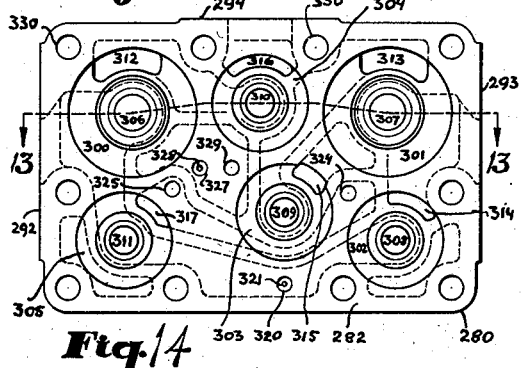
Figure 17:
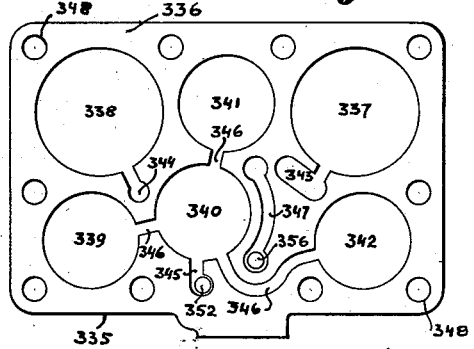

On the cover 335 is mounted a solenoid valve 350 (Figs. 15 and 22). It has an inlet chamber 351 which, through an opening 352, communicates with the passage 345 and in which is mounted a ferrule 353 to which is cemented a port bushing 354 made of soft rubber and opening into an outlet chamber 355 which, through an opening 356, communicates with passage 347. The valve member of the solenoid valve 350 is a needle 358, advantageously made of stainless steel, with a loosely fitting armature 359, as shown in Fig. 22, both movable within a tube 360 which is sweated into a bushing 361 screwed into the valve cover 335. Over the tube 360 is fitted a coil 362 for operating the valve.

Figure 18:
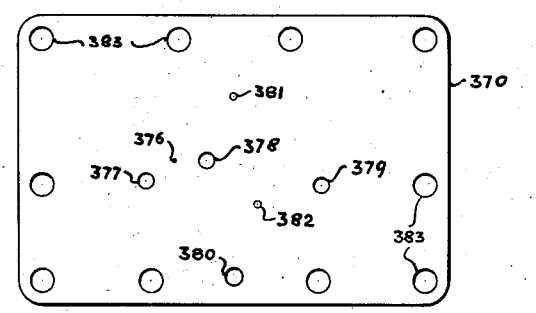

Between the face 282 of the valve body 280 and the face 336 of the valve cover 335 is a diaphragm assembly of the type disclosed in the aforementioned Davis and Pick application. The assembly comprises a diaphragm 370, a perforated support plate 371 on one side thereof, a perforated support plate 372 on the other side thereof, a gasket 373 placed between plate 371 and face 282, and a gasket 374 placed between plate 372 and face 336. The diaphragm 370 has openings 376, 377, 378, 379, 380, 381 and 382, and screw holes 383 as shown in Fig. 18. The perforated support plate 372 is provided with bulges 385, 386, 387, 388, 389 and 390, which extend into the pressure chambers 337, 338, 339, 340, 341 and 342, respectively. The plates 371 and 372, and the gaskets 373 and 374 have openings and holes matching those in diaphragm 370. Over the opening in the perforated plate 372 which matches the opening 376 is mounted a strainer 375. The plate 371 has additional openings through which the ports 306 to 311 project, as shown in Figs. 19 to 23. The gaskets 373 and 374 are cut out so as not to extend across the chambers 300 to 305 and 337 to 342.

To the bulges 385, 386, 387 and 390 are fastened helical springs 392 by means of rivets 393 and carrying plates 394 which rest against the diaphragm 370. These springs thus press the diaphragm 370 against the central ports 306, 307, 308 and 311, tending to keep the ports closed in the absence of any appreciable excess in the pressure existing in the valve chambers over the pressure existing in the corresponding pressure chambers.

Studs 397 are attached to the diaphragm 370 by means of screws 398 passing through the openings 381 and 382 in the diaphragm 370. The studs 397 have a slide fit in openings 399 in the bulges 388 and 389. Over the studs 397 are fitted springs 400 retained by washers 401 and cotter pins 402 so that they tend to pull the diaphragm 370 away from the central ports 309 and 310 and thus keep these ports open unless the pressure in the pressure chambers 340 and 341 substantially exceeds the pressure existing in the opposed valve chambers 303 and 304.

Two studs 405 (Fig. 9) serve to properly locate the gasket 271, the cover plate 270, the gasket 279, the valve body 280, the diaphragm assembly, and the valve cover 335 on the face 252 of casing 219. Nuts 406 and screws 407 retain all these parts on the face 252 in water-tight relationship.

A cover 410 is fitted over the solenoid valve 350 and held against the face 252 of the casing 219 by means of a screw 411 and stud 412. On the cover 410 is mounted a time switch 413 of the type described in conjunction with Figs. 1 and 2. The time switch 413 is secured in place by a nut 414 which also holds a dial 415. For actuation, the time switch 413 has a switch handle 416. Binding posts 417 and 418 are provided to make the electrical connections.

An extension cord 420 with a plug 421 passes through a rubber ferrule 422 to the inside of the cover 410 and is secured in place by a clamp 423 (Fig. 19). The cord 420 has two wires 424 and 425, one secured to the binding post 417 and the others to a wire 426 of the solenoid coil 362 by means of a wire nut 427. A second wire 428 extending from the solenoid coil 362 is secured to the binding post 418.

As shown in Figs. 19 to 23, the valve body 280 and the valve cover 335, with the diaphragm assembly therebetween, provide 6 diaphragm valves. For the sake of brevity, each of the numerals 300 to 305 will be used, in describing the operation of the apparatus, to denote an entire diaphragm valve of which one of the valve chambers 300 to 305 forms an essential part.

*Comparison of the apparatus of Figs. 1 and 2 with that of Figs. 9 to 23*

The pipe connections of the apparatus shown diagrammatically in Figs. 1 and 2, as has been noted initially, are replaced in the apparatus of Figs. 9 to 23 by various passages and openings. In order to aid in an understanding of the functioning of the apparatus of Figs. 9 to 23 the corresponding elements for providing the flow passages in the two arrangements will now be pointed out.

The pipe 33 corresponds to tube 212, passage 263, opening 276 and passage 289 (see Fig. 19).

Figure 12:
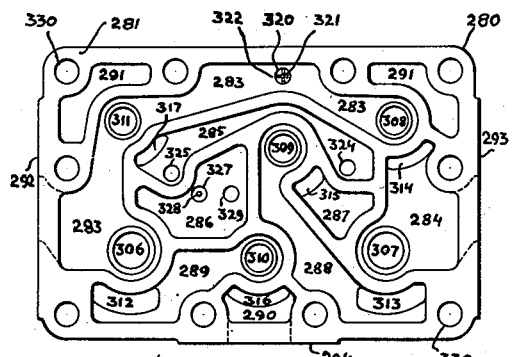

The pipe 39 corresponds to passage 264, opening 274, and passage 288 (see Figs. 12 and 20).

The pipe 44 corresponds to passages 265 and 254, opening 272, and passage 287 (see Figs. 12 and 21).

The pipe 48 has its counterpart in the upper portion of the passage 254 (see Figs. 10 and 21).

The waste pipe 50 has its counterpart in passage 255, opening 275, passage 290, and flange 297 (see Figs. 10 and 22).

The pipe 52 is eliminated in the arrangement of Figs. 9 to 23 because the orifice 262 is in a wall of the casing 219 which divides the chamber 220 from the waste passage 255 so that the orifice or weep hole 262 discharges directly from the chamber 220 into the passage 255, as shown in Fig. 19.

The supply pipe 70 has its counterpart in flange 295 and passage 283 (see Fig. 12).

The service pipe 78 has its counterpart in flange 296 and passage 284 (see Fig. 12).

The control pipe 72 corresponds to opening 380, passages 345 and 346 and the opening 352 leading to the inlet chamber 351 of the solenoid valve 350 (see Figs. 15, 17, 18 and 21).

The control pipe 74 corresponds to passage 285, openings 324, 325, 377 and 379, and passages 343 and 344 ( see Figs. 12, 17, 18 and 23).

The pipe 76 corresponds to passage 356 (which leads from the outlet chamber 355 of the solenoid valve 350), passage 347, openings 378 and 329, passage 286 (into which the orifice 328 discharges) opening 273, and passage 253 (see Figs. 10, 11, 12, 17, 18, 21 and 23).

As is apparent from Fig. 10, the upper portion of the passage 253 corresponds to the head box 45 of Fig. 1 since the weir 257 maintains a constant head over the orifices 260 and 261 by discharging into the passage 255 any water entering passage 253 in excess of the two streams flowing through orifices 260 and 261. The orifices 260 and 261 are placed at the same elevation which is advantageous because their discharges then remain in a fixed ratio, determined by their respective cross-sectional areas.

With regard to the orifices: 46 has its counterpart 260, 47 in 261, 51 in 262, 71 in 321, and 75 in 328 and 376. It is advantageous to employ two orifices in series to provide the flow restriction effected by orifice 75 in Fig. 1, orifice 328 in the bushing 327 and orifice 376 in the rubber diaphragm 370, because with this arrangement each of the two orifices can be made larger in diameter and, therefore, less subject to clogging, than if a single orifice were used, to restrict the rate of flow therethrough under given conditions to a predetermined value. Moreover, the combination of a rubber orifice in series with a metal orifice has advantageous flow characteristics.

The diaphragm valves 55, 56, 57, 58, 59 and 60 have their counterparts in diaphragm valves 300, 301, 302, 303, 304 and 305, respectively, and the solenoid valve 54 in the solenoid valve 350.

*Operation of the apparatus of Figs. 9 to 23*

For use of the apparatus the elbow 295 is connected to a source of water under pressure which is to be treated, the elbow 296 is connected to a point of use for treated water, and the elbow 297 is connected to a point of disposal for waste water. The waste connection must be sufficiently large and must also have sufficient pitch away from the elbow 297 so as not to create any back pressure. The plug 421 is inserted in a receptacle to provide the electric energy required for regeneration.

During normal use the switch handle 416 is in its normal position so that the time switch 413 is open and the coil 362 de-energized. The needle 358 consequently rests on the port bushing 354 and the solenoid valve 350 is closed. Therefore, the water which enters from elbow 295 and passage 283 through the orifice 321 and opening 380 into the system comprising passage 345, chamber 340, passages 346 and chambers 339, 341 and 342 finds no outlet and the full pressure of the available water supply exists in the pressure chambers 339, 340, 341 and 342. Diaphragm valves 302, 303, 304 and 305 are, therefore, closed.

Since the valve 305 is closed, no pressure water can enter the system comprising passage 285, openings 324, 325, 377 and 379, passages 343 and 344, and pressure chambers 337 and 338. Any pressure existing in this system is, therefore, relieved through the orifices 376 and 328 into passage 286 which is under atmospheric pressure because of its connection through the opening 273 with passage 253 which communicates through the opening 258 with the chamber 220. Because of the absence of pressure the diaphragm valves 300 and 301 open and a flow of water takes place from elbow 295 through passage 283, valve 300, passage 289, opening 276, passage 263, tube 212 to the distributor 204, thence upwardly through the bed 239 of ion exchange material whereby the water is being treated, and then through the collector 232, compartment 231, passage 264, opening 274, passage 288, valve 301, passage 284 and elbow 296 to a point of use.

When the capacity of the bed 239 has been exhausted, the user initiates regeneration by turning the switch handle 416 so as to close the time switch 413 and place it in operation. He also introduces an appropriate quantity of regenerant into the chamber 220. To this end the user removes the cover 245, turns it upside down and fills the measuring compartment 250 with regenerant. He then turns the cover right side up above the chamber 220 and drops it back into its place on casing 219. Thus, in one single operation the regenerant is introduced into the chamber 220 and the cover 245 is replaced to close the chamber 220. The regenerant comes to rest as a layer supported by the screen 241. Such regenerant should be relatively free of insoluble impurities which might remain and accumulate on the screen 241 or in the passages of the apparatus, thus in time interfering with its correct functioning. Coarse, evaporated salt, for instance, has been found a satisfactory regenerant when the apparatus is used to soften water by cation exchange.

The closing of the time switch 413 energizes the coil 362 which raises the armature 359 to lift the needle 358 from its seat on the port bushing 354, thus opening the solenoid valve 350. This relieves the pressure in pressure chambers 339, 340, 341 and 342 through the passages 346 and 345, the opening 352, the solenoid valve 350, the opening 356, passage 347, openings 378 and 329, and passage 286. The diaphragm valves 302, 303, 304 and 305 consequently open, while a stream of water from passage 283 and controlled by the size of orifice 321, in which it dissipates substantially all of its pressure, flows through opening 380, passage 345, opening 352, solenoid valve 350, opening 356, passage 347, and openings 378 and 329 into the passage 286.

The opening of valve 305 permits an unrestricted flow of water from passage 283 into the passage 285 whence its pressure is communicated via openings 325 and 377 and passage 343 to the pressure chamber 337, and also via openings 324 and 379 and passage 344 to the pressure chamber 338. This causes diaphragm valves 300 and 301 to close, thus interrupting flow through the apparatus to service. A small stream of water flows from passage 343 through the orifices 376 and 328 into the passage 286, dissipating substantially all of its pressure during its flow through the two orifices. The screen 375 protects the orifices 376 and 328 against clogging.

The two streams of water entering passage 286 through orifice 328 and through opening 329 continue as a joint stream through opening 273 into the passage 253, rising therein until a discharge takes place through orifice 260 into the chamber 220, through orifice 261 into the passage 254, and over weir 257 into the passage 255. Since the orifices 321 and 376, 328 are so dimensioned as to provide a joint rate of flow which, over the range of supply pressures normally encountered, exceeds the discharge of orifices 260 and 261, as has been explained in connection with Figs. 1 and 2, there is always some flow over the weir 257, so that the head over orifices 260 and 261 and, consequently, the rates of flow through them are constant.

The stream of water entering chamber 220 through orifice 260 percolates through and thereby dissolves the layer of regenerant resting on screen 241, forming highly concentrated regenerating solution which then continues via passage 265 into passage 254 where it mingles with and thus becomes diluted by the stream of water entering passage 254 through orifice 261. The resulting dilute regenerant solution then flows through opening 272, passage 287, diaphragm valve 303, passage 288, opening 274, passage 264, compartment 231, and collector 232 into the tank 200. It passes downwardly through the bed 239, regenerating it, and then flows through the distributor 204, tube 212, passage 263, opening 276, passage 289, and diaphragm valve 304 into passage 290. There it meets the stream of water flowing over the weir 257 through passage 255 and opening 275, and the joint streams continue through the elbow 297 to a point of disposal for waste water.

The pressure for causing flow through the bed 239 is provided by a head of water in chamber 220 above the level of opening 275, the passage 290 being vented at that elevation by virtue of communication, through passage 255 and opening 258, with the chamber 220. The level in chamber 220 is normally at or below the level of orifices 260 and 261. If the resistance of the bed 239 should increase, the level in chamber 220 and passage 254 will rise, submerging the orifices 260 and 261 and reducing the effective head acting on them so that flow through them is reduced proportionately until a new equilibrium is reached.

The head causing flow through the apparatus during regeneration consists of the difference between the level in chamber 220 and the elevation of opening 275. Since the specific gravity of the liquid flowing through the apparatus changes during regeneration, being higher at first because of dissolved regenerant, and lower later when rinse water flows through the apparatus, the level in chamber 220 will change in the course of a regenerating cycle. The level in chamber 220 will also vary somewhat from one cycle to the next because of variations in the flow resistance of the bed 239 and the layer of regenerant in chamber 220. In spite of such changes in level, however, the flow remains substantially constant because of the constant head maintained over orifices 260 and 261.

After all regenerant in chamber 220 has been dissolved water continues to flow from orifice 260 through chamber 220. The combined streams of water discharged by orifices 260 and 261 follow the same path that had previously been taken by dilute regenerant solution, rinsing spent and excess regenerant from the bed 239.

During regeneration and rinsing of the apparatus, hard water is available from the elbow 295 through passage 283, open diaphragm valve 302, passage 284 and the elbow 296 to the point of use.

After an appropriate interval of time, the switch handle 416 returns to its normal position. The time switch 413 stops and comes to rest in its open position, de-energizing the coil 362. The armature 359 drops, knocking the needle 358 into the port bushing 354, thus closing the solenoid valve 350. This causes diaphragm valves 302, 303, 304 and 305 to close, and diaphragm valves 300 and 301 to open, thereby restoring the apparatus to service position as initially described.

During regeneration there is a flow of water from chamber 220 through orifice 262 into the waste passage 255. Since the diameter of orifice 262 is small, about $\frac{1}{32}$ inch, and the head in chamber 220 above it low, this flow is quite small and inconsequential. No regenerant is lost with this flow because the orifice 262 is located above the layer of regenerant. After regeneration has been completed this small flow continues until the level in chamber 220 has dropped down to orifice 262. Thus, there is room in chamber 220 to accommodate the regenerant for the next succeeding regeneration without any overflow from chamber 220 through opening 258.

The functions of springs 392 and 400 will now be explained. Taking, for instance, valve 300 there is full supply pressure in valve chamber 300 when the apparatus is in normal service, and no pressure in the pressure chamber 337. The pressure in valve chamber 300 is sufficient to overcome the pressure exerted by the spring 392, and the valve, therefore, remains open. When regeneration is initiated, the full supply pressure is communicated to the pressure chamber 337. The pressures in chambers 300 and 337 are, therefore, equal, and there would be no force to act on the diaphragm if it were not for the force provided by the spring 392 to insure that the valve 300 closes. Similar considerations apply to valves 301, 302 and 305, except that in the cases of valves 302 and 305 a balanced pressure condition requiring spring pressure to effect closing exists at the end of regeneration after the solenoid valve 350 has been closed to return the apparatus to normal service.

During normal operation there is no pressure in the valve chambers 303 and 304 since they are in free communication with the chamber 220 and the waste elbow 297, respectively. At the same time the full supply pressure is communicated to the pressure chambers 340 and 341 overcoming the pull of springs 400 and closing the valves 303 and 304. On initiation of regeneration the pressure in chambers 340 and 341 is dissipated so that there is now no pressure on either side of the diaphragm 370, and the only force to open valves 303 and 304 by moving the diaphragm 370 away from the central ports 309 and 310 so as to permit flow of regenerant solution and rinse water through the bed 239 is supplied by the springs 400. Instead of the pull springs 400, arranged as shown in Figs. 21 and 22, push springs could be employed on the other side of diaphragm 370, located either within the central ports 309 and 310, as is the spring 122 in Fig. 5, or on the outside of the central ports 309 and 310.

The casing 219, valve body 280 and valve cover 335 are designed to be made of cast bronze or iron, corrosion of the latter being prevented by a suitable protective coating. The orifices, bushings and central valve ports are best made of red brass or bronze, and the springs 392 and 400 of Phosphor bronze. The cover plate 270 need not be a separate part as it can be cast integral with the casing 219, eliminating the need for the gasket 269, but complicating the coring of the casing 219.

The switch for energizing the solenoid valve need, of course, not be of the type shown and described. Instead, other types of switches can be used, operated either manually or automatically.

The apparatus can be used for ion exchange treatment other than softening, such as cation exchange on the hydrogen cycle, or anion exchange.

While I have shown and described what I consider the preferred embodiments, modifications may be made without departing from the spirit of my invention, and reference is, therefore, made to the appended claims for a definition of the scope of my invention.

What I claim is:

1. A water treating apparatus comprising a tank for ion exchange material, said tank having a top head and a bottom head, two openings in said top head, a strainer within said tank adjacent to said bottom head, a tube having its one end connected with said strainer and its other end protruding through one of said openings, a mechanism for controlling flow through said tank, said mechanism having a flat face and being mounted on said tank with said flat face juxtaposed to said top head, passages in said mechanism opening into said flat face and communicating with said openings, said protruding end of said tube extending into one of said passages, a gasket between said top head and said flat face, a packing ring fitted over said protruding end of said tube, and means for pressing said packing ring against said tube.

2. A water treating apparatus comprising a tank for ion exchange material adapted to be operated in a cyclic sequence of steps including service, backwashing and regeneration, means for connecting said apparatus to a source of water to be treated, a point of use and waste, diaphragm valves for controlling flow through said apparatus and comprising a first group to control service flow, a second group to control backwash flow, and a third group to control regeneration flow, a pressure chamber for each of said diaphragm valves, interconnections for the pressure chambers of each group of diaphragm valves, a pair of passages for said pressure chambers of each of said groups, one of each pair of passages leading to said source and the other leading to a point of atmospheric pressure, control valve means in one of each pair of passages, a flow restriction in the other of each pair of passages, and means for closing all of said control valve means during the service step, for opening the control valve means for said first and second group during the backwashing step, and for opening the control valve means for said first and third group during the regeneration step.

3. A water treating apparatus adapted to be operated in a cyclic sequence of steps including normal service and regeneration, and comprising a tank for ion exchange material, a regenerant chamber, a head box, a restricted flow passage from said head box to said regenerant chamber, a supply connection leading from said tank and adapted to be connected to a source of water under pressure, a supply diaphragm valve in said supply connection, an outlet connection leading from said tank and adapted to be connected to a point of use, an outlet diaphragm valve in said outlet connection, an inlet connection leading from said regenerant chamber to said tank, an inlet diaphragm valve in said inlet connection, a waste connection leading from said tank and adapted to be connected with a point of disposal for waste water, a waste diaphragm valve in said waste connection, each of said diaphragm valves having a pressure chamber and being arranged to close on application of pressure to said pressure chamber, passage means leading from said supply connection to the pressure chambers of said supply and outlet diaphragm valves, control valve means in said passage means, permanently open flow passage means communicating with the pressure chambers of said supply and outlet diaphragm valves and leading to a point of atmospheric pressure, permanently open flow passage means leading from said supply connection to the pressure chambers of said inlet and waste diaphragm valves, flow passage means communicating with the pressure chambers of said inlet and waste diaphragm valves and leading to a point of atmospheric pressure, at least one of said points of atmospheric pressure being located in said head box, other control valve means in said last-named flow passage means, and means for closing both said control valve means during normal service and for opening both said control valve means during regeneration.

4. The apparatus of claim 3, said first named control valve means being a diaphragm valve having a pressure chamber in permanent communication with the pressure chambers of said inlet and waste diaphragm valves, said other control valve means being a normally closed solenoid valve adapted to be opened upon energization, and a switch for energizing and de-energizing said solenoid valve.

5. In the apparatus of claim 3, a flow restriction in each of said permanently open flow passage means.

6. In the apparatus of claim 3, an overflow passage for said head box leading to said waste connection, and a restricted flow connection below the level of said restricted flow passage, said restricted flow connection leading to said overflow passage and communicating with said regenerant chamber.

7. In the apparatus of claim 3, another restricted flow passage leading from said head box to said inlet connection and located below said first named restricted flow passage.

8. A water treating apparatus adapted to be operated in a cyclic sequence of steps including normal service and regeneration, and comprising a tank for ion exchange material, a regenerant chamber, a head box, a supply connection leading to said head box and adapted to be connected to a source of water under pressure, a discharge connection leading from said tank and adapted to be connected to a point of disposal for waste water, an inlet connection leading from said regenerant chamber to said tank, a valve in each of said three connections, means for opening and closing said valves in unison, a flow restricting passage leading from said head box to said regenerant chamber, and an overflow passage connected with said discharge connection and terminating in said head box above said flow restricting passage.

9. In the apparatus of claim 8, a restricted flow connection located below said flow restricting passage and leading from said head box to said inlet connection.

10. In the apparatus of claim 8, a restricted flow connection located below said flow restricting passage, connected with said overflow passage, and communicating with said regenerant chamber.

11. A water treating apparatus comprising a tank for ion exchange material, said tank having a flat top head and a bottom head, two openings in said top head, a strainer within said tank adjacent to said bottom head, a tube having its one end connected with said strainer and its other end located in one of said two openings, and means for controlling flow through said tank and for regenerating said ion exchange material, said means having a flat face and being mounted on said tank with said flat face juxtaposed to said top head, a pair of ports in said flat face each communicating with one of said openings, said means including a regenerant chamber, a flat surface on said regenerant chamber, a valve mechanism having a flat surface attached to said flat regenerant chamber surface, a passage connecting said valve mechanism with said regenerant chamber, a pair of passages each connecting said valve mechanism with one of said ports, and other passages communicating with said valve mechanism and adapted to be connected with a supply of water to be treated, a point of use for treated water, and a point of disposal for waste water.

12. The apparatus of claim 1, said means being a chamfer in said flat face.

ERIC PICK.

REFERENCES CITED

The following references are of record in the file of this patent:

UNITED STATES PATENTS

| Number | Name | Date |
| --- | --- | --- |
| 1,211,735 | Magrath | Jan. 9, 1917 |
| 1,694,457 | Toulmin | Dec. 11, 1928 |
| 1,725,110 | Stickney | Aug. 20, 1929 |
| 1,749,622 | Yount | Mar. 4, 1930 |
| 1,789,314 | Lindsay | Jan. 20, 1931 |
| 1,905,726 | Lindsay | Apr. 25, 1933 |
| 1,911,412 | Wagner | May 30, 1933 |
| 1,937,325 | Pick | Nov. 28, 1933 |
| 1,937,666 | Olson et al. | Dec. 5, 1933 |
| 1,949,044 | Dotterweich | Feb. 27, 1934 |
| 1,964,302 | Shetler | Jan. 26, 1934 |
| 1,990,722 | Bashioum | Feb. 12, 1935 |
| 2,052,515 | Pick | Aug. 25, 1936 |
| 2,076,321 | Pick | Apr. 6, 1937 |
| 2,287,284 | Behrman | June 23, 1942 |